US012223104B2

(12) United States Patent
LeBeau et al.

(10) Patent No.: US 12,223,104 B2
(45) Date of Patent: Feb. 11, 2025

(54) PARTIAL PASSTHROUGH IN VIRTUAL REALITY

(71) Applicant: Meta Platforms Technologies, LLC, Menlo Park, CA (US)

(72) Inventors: Michael James LeBeau, London (GB); John Nicholas Jitkoff, Seattle, WA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 349 days.

(21) Appl. No.: 17/498,284

(22) Filed: Oct. 11, 2021

(65) Prior Publication Data

US 2022/0197382 A1 Jun. 23, 2022

Related U.S. Application Data

(60) Provisional application No. 63/129,486, filed on Dec. 22, 2020.

(51) Int. Cl.
*G06F 3/01* (2006.01)
*G06T 11/00* (2006.01)

(52) U.S. Cl.
CPC .............. *G06F 3/014* (2013.01); *G06F 3/017* (2013.01); *G06T 11/00* (2013.01)

(58) Field of Classification Search
None
See application file for complete search history.

(56) References Cited

U.S. PATENT DOCUMENTS

| 6,175,840 | B1 | 1/2001 | Chen et al. |
| 6,556,196 | B1 | 4/2003 | Blanz et al. |
| 6,792,147 | B1 | 9/2004 | Saka et al. |
| 6,842,175 | B1 | 1/2005 | Schmalstieg et al. |
| 7,701,439 | B2 | 4/2010 | Hillis et al. |
| 8,026,918 | B1 | 9/2011 | Murphy |
| D683,749 | S | 6/2013 | Hally |
| D689,874 | S | 9/2013 | Brinda et al. |
| 8,947,351 | B1 | 2/2015 | Noble |
| D726,219 | S | 4/2015 | Chaudhri et al. |

(Continued)

FOREIGN PATENT DOCUMENTS

CN 113050795 A 6/2021

OTHER PUBLICATIONS

International Preliminary Report on Patentability for International Application No. PCT/US2020/052976, mailed May 5, 2022, 9 pages.

(Continued)

*Primary Examiner* — Parul H Gupta
(74) *Attorney, Agent, or Firm* — Potomac Law Group, PLLC; Dannon G. Allbee

(57) ABSTRACT

Systems and methods for providing partial passthrough video to a user of a virtual reality device are disclosed herein. Providing the partial passthrough video can include detecting a hand passthrough trigger event and identifying a hand passthrough video feed. Providing partial passthrough video can further include aligning the hand passthrough video feed with a virtual environment presented to a user by the virtual environment and, based on the aligning of the hand passthrough video feed with the virtual environment, overlaying the hand passthrough video feed on the virtual environment.

20 Claims, 9 Drawing Sheets

(56) References Cited

U.S. PATENT DOCUMENTS

| | | |
|---|---|---|
| D727,352 S | 4/2015 | Ray et al. |
| D727,354 S | 4/2015 | Park et al. |
| 9,052,820 B2 | 6/2015 | Jarrett et al. |
| D733,740 S | 7/2015 | Lee et al. |
| 9,117,274 B2 | 8/2015 | Liao et al. |
| 9,292,089 B1 | 3/2016 | Sadek |
| D761,273 S | 7/2016 | Kim et al. |
| D763,279 S | 8/2016 | Jou |
| 9,477,368 B1 | 10/2016 | Filip et al. |
| D775,179 S | 12/2016 | Kimura et al. |
| D775,196 S | 12/2016 | Huang et al. |
| 9,530,252 B2 | 12/2016 | Poulos et al. |
| D780,794 S | 3/2017 | Kisielius et al. |
| D781,905 S | 3/2017 | Nakaguchi et al. |
| D783,037 S | 4/2017 | Hariharan et al. |
| D784,394 S | 4/2017 | Laing et al. |
| D784,395 S | 4/2017 | Laing et al. |
| D787,527 S | 5/2017 | Wilberding |
| D788,136 S | 5/2017 | Jaini et al. |
| D788,793 S | 6/2017 | Ogundokun et al. |
| D789,416 S | 6/2017 | Baluja et al. |
| D789,977 S | 6/2017 | Mijatovic et al. |
| D790,567 S | 6/2017 | Su et al. |
| D791,823 S | 7/2017 | Zhou |
| D793,403 S | 8/2017 | Cross et al. |
| 9,770,203 B1 | 9/2017 | Berme et al. |
| 9,817,472 B2 | 11/2017 | Lee et al. |
| D817,994 S | 5/2018 | Jou |
| D819,065 S | 5/2018 | Xie et al. |
| D824,951 S | 8/2018 | Kolbrener et al. |
| D828,381 S | 9/2018 | Lee et al. |
| D829,231 S | 9/2018 | Hess et al. |
| D831,681 S | 10/2018 | Eilertsen |
| D835,665 S | 12/2018 | Kimura et al. |
| 10,168,768 B1 | 1/2019 | Kinstner |
| 10,168,798 B2 | 1/2019 | Tsang |
| 10,176,636 B1 | 1/2019 | Neustein et al. |
| D842,889 S | 3/2019 | Krainer et al. |
| 10,220,303 B1 | 3/2019 | Schmidt et al. |
| 10,248,284 B2 | 4/2019 | Itani et al. |
| D848,474 S | 5/2019 | Baumez et al. |
| D850,468 S | 6/2019 | Malahy et al. |
| D851,123 S | 6/2019 | Turner |
| D853,431 S | 7/2019 | Sagrillo et al. |
| D854,551 S | 7/2019 | Pistiner et al. |
| D856,366 S | 8/2019 | Richardson |
| D859,426 S | 9/2019 | Poes |
| 10,473,935 B1 | 11/2019 | Gribetz et al. |
| 10,521,944 B2 | 12/2019 | Sareen et al. |
| 10,665,019 B2 | 5/2020 | Hildreth et al. |
| D888,071 S | 6/2020 | Wilberding |
| D900,123 S | 10/2020 | Lopes |
| D908,713 S | 1/2021 | Fremine et al. |
| D910,655 S | 2/2021 | Matthewman et al. |
| D910,660 S | 2/2021 | Chaturvedi et al. |
| 10,916,220 B2 | 2/2021 | Ngo |
| 10,976,804 B1 | 4/2021 | Atlas et al. |
| 10,987,573 B2 | 4/2021 | Nietfeld et al. |
| 10,990,240 B1 | 4/2021 | Ravasz et al. |
| 11,086,476 B2 | 8/2021 | Inch et al. |
| 11,184,574 B2 | 11/2021 | Reif |
| 11,435,593 B1 | 9/2022 | Sztuk et al. |
| 2007/0222769 A1 | 9/2007 | Otsuka et al. |
| 2008/0089587 A1 | 4/2008 | Kim et al. |
| 2009/0044113 A1 | 2/2009 | Jones et al. |
| 2010/0103196 A1 | 4/2010 | Kumar et al. |
| 2010/0306716 A1 | 12/2010 | Perez |
| 2011/0148916 A1 | 6/2011 | Blattner |
| 2011/0267265 A1 | 11/2011 | Stinson |
| 2011/0302535 A1 | 12/2011 | Clerc et al. |
| 2012/0062444 A1 | 3/2012 | Cok et al. |
| 2012/0069168 A1 | 3/2012 | Huang et al. |
| 2012/0105473 A1 | 5/2012 | Bar-Zeev et al. |
| 2012/0113140 A1 | 5/2012 | Hilliges et al. |
| 2012/0113223 A1 | 5/2012 | Hilliges et al. |
| 2012/0117514 A1* | 5/2012 | Kim .................. G06F 3/017 345/158 |
| 2012/0143358 A1 | 6/2012 | Adams et al. |
| 2012/0206345 A1 | 8/2012 | Langridge |
| 2012/0275686 A1 | 11/2012 | Wilson et al. |
| 2012/0293544 A1 | 11/2012 | Miyamoto et al. |
| 2013/0063345 A1 | 3/2013 | Maeda |
| 2013/0093789 A1 | 4/2013 | Liu et al. |
| 2013/0125066 A1 | 5/2013 | Klein et al. |
| 2013/0147793 A1 | 6/2013 | Jeon et al. |
| 2013/0265220 A1 | 10/2013 | Fleischmann et al. |
| 2014/0078176 A1 | 3/2014 | Kim et al. |
| 2014/0125598 A1 | 5/2014 | Cheng et al. |
| 2014/0191946 A1 | 7/2014 | Cho et al. |
| 2014/0236996 A1 | 8/2014 | Masuko et al. |
| 2014/0361976 A1 | 12/2014 | Osman et al. |
| 2014/0364215 A1 | 12/2014 | Mikhailov et al. |
| 2015/0035746 A1 | 2/2015 | Cockburn et al. |
| 2015/0049018 A1 | 2/2015 | Gomez |
| 2015/0054742 A1 | 2/2015 | Imoto et al. |
| 2015/0062160 A1 | 3/2015 | Sakamoto et al. |
| 2015/0094142 A1 | 4/2015 | Stafford |
| 2015/0123967 A1 | 5/2015 | Quinn et al. |
| 2015/0153833 A1 | 6/2015 | Pinault et al. |
| 2015/0160736 A1 | 6/2015 | Fujiwara |
| 2015/0169076 A1 | 6/2015 | Cohen et al. |
| 2015/0181679 A1 | 6/2015 | Liao et al. |
| 2015/0206321 A1 | 7/2015 | Scavezze et al. |
| 2015/0220150 A1 | 8/2015 | Plagemann et al. |
| 2015/0261659 A1 | 9/2015 | Bader et al. |
| 2015/0293666 A1 | 10/2015 | Lee et al. |
| 2015/0358614 A1 | 12/2015 | Jin |
| 2015/0371441 A1 | 12/2015 | Shim |
| 2016/0062618 A1 | 3/2016 | Fagan et al. |
| 2016/0093108 A1 | 3/2016 | Mao et al. |
| 2016/0110052 A1 | 4/2016 | Kim et al. |
| 2016/0147308 A1 | 5/2016 | Gelman et al. |
| 2016/0170603 A1 | 6/2016 | Bastien et al. |
| 2016/0250548 A1 | 9/2016 | Tsuchiya et al. |
| 2016/0253841 A1 | 9/2016 | Ur et al. |
| 2016/0314341 A1 | 10/2016 | Maranzana et al. |
| 2016/0378291 A1 | 12/2016 | Pokrzywka |
| 2017/0031503 A1 | 2/2017 | Rosenberg et al. |
| 2017/0060230 A1 | 3/2017 | Faaborg et al. |
| 2017/0061696 A1* | 3/2017 | Li .................. G02B 27/017 |
| 2017/0109936 A1 | 4/2017 | Powderly et al. |
| 2017/0139478 A1 | 5/2017 | Jeon et al. |
| 2017/0153698 A1 | 6/2017 | Bamidele et al. |
| 2017/0153709 A1 | 6/2017 | Kondo |
| 2017/0192513 A1 | 7/2017 | Karmon et al. |
| 2017/0236320 A1 | 8/2017 | Gribetz et al. |
| 2017/0237789 A1 | 8/2017 | Harner et al. |
| 2017/0262063 A1 | 9/2017 | Blenessy et al. |
| 2017/0263056 A1 | 9/2017 | Leppanen et al. |
| 2017/0266551 A1 | 9/2017 | Baba |
| 2017/0270715 A1 | 9/2017 | Lindsay et al. |
| 2017/0278304 A1 | 9/2017 | Hildreth et al. |
| 2017/0287215 A1 | 10/2017 | Lalonde et al. |
| 2017/0287225 A1 | 10/2017 | Powderly et al. |
| 2017/0296363 A1 | 10/2017 | Yetkin et al. |
| 2017/0316606 A1 | 11/2017 | Khalid et al. |
| 2017/0336951 A1 | 11/2017 | Palmaro |
| 2017/0364198 A1 | 12/2017 | Yoganandan et al. |
| 2017/0364960 A1 | 12/2017 | Huang |
| 2018/0004286 A1 | 1/2018 | Chen |
| 2018/0059901 A1 | 3/2018 | Gullicksen |
| 2018/0082454 A1 | 3/2018 | Sahu et al. |
| 2018/0095542 A1 | 4/2018 | Mallinson |
| 2018/0107278 A1 | 4/2018 | Goel et al. |
| 2018/0108179 A1 | 4/2018 | Tomlin et al. |
| 2018/0113599 A1 | 4/2018 | Yin |
| 2018/0120944 A1 | 5/2018 | Wang et al. |
| 2018/0144556 A1 | 5/2018 | Champion et al. |
| 2018/0150993 A1 | 5/2018 | Newell et al. |
| 2018/0285636 A1 | 10/2018 | Fei et al. |
| 2018/0307303 A1 | 10/2018 | Powderly et al. |
| 2018/0322701 A1 | 11/2018 | Pahud et al. |
| 2018/0335925 A1 | 11/2018 | Hsiao et al. |
| 2018/0349690 A1 | 12/2018 | Rhee et al. |

(56) References Cited

U.S. PATENT DOCUMENTS

| | | |
|---|---|---|
| 2019/0050427 A1 | 2/2019 | Wiesel et al. |
| 2019/0065027 A1 | 2/2019 | Hauenstein et al. |
| 2019/0094981 A1 | 3/2019 | Bradski et al. |
| 2019/0099681 A1 | 4/2019 | Rico et al. |
| 2019/0102044 A1 | 4/2019 | Wang et al. |
| 2019/0107894 A1 | 4/2019 | Hebbalaguppe et al. |
| 2019/0130172 A1 | 5/2019 | Zhong et al. |
| 2019/0213792 A1 | 7/2019 | Jakubzak et al. |
| 2019/0236344 A1 | 8/2019 | Chen et al. |
| 2019/0258318 A1 | 8/2019 | Qin et al. |
| 2019/0278376 A1 | 9/2019 | Kutliroff et al. |
| 2019/0279424 A1 | 9/2019 | Clausen et al. |
| 2019/0286231 A1 | 9/2019 | Burns et al. |
| 2019/0310757 A1 | 10/2019 | Lee et al. |
| 2019/0313915 A1 | 10/2019 | Tzvieli et al. |
| 2019/0340419 A1 | 11/2019 | Milman et al. |
| 2019/0362562 A1 | 11/2019 | Benson |
| 2019/0369722 A1 | 12/2019 | Lehtiniemi et al. |
| 2019/0377416 A1 | 12/2019 | Alexander |
| 2019/0385368 A1 | 12/2019 | Cartwright et al. |
| 2019/0385372 A1* | 12/2019 | Cartwright ............ G06T 19/003 |
| 2020/0050289 A1 | 2/2020 | Hardie-Bick et al. |
| 2020/0051527 A1 | 2/2020 | Ngo |
| 2020/0082629 A1 | 3/2020 | Jones et al. |
| 2020/0097077 A1 | 3/2020 | Nguyen et al. |
| 2020/0097091 A1 | 3/2020 | Chou et al. |
| 2020/0111260 A1 | 4/2020 | Osborn et al. |
| 2020/0225736 A1 | 7/2020 | Schwarz et al. |
| 2020/0225758 A1 | 7/2020 | Tang et al. |
| 2020/0226814 A1 | 7/2020 | Tang et al. |
| 2020/0258278 A1 | 8/2020 | Mirhosseini et al. |
| 2020/0306640 A1 | 10/2020 | Kolen et al. |
| 2020/0312002 A1 | 10/2020 | Comploi et al. |
| 2021/0007607 A1 | 1/2021 | Frank et al. |
| 2021/0011556 A1 | 1/2021 | Atlas et al. |
| 2021/0019911 A1 | 1/2021 | Kusakabe et al. |
| 2021/0090333 A1 | 3/2021 | Ravasz et al. |
| 2021/0124475 A1 | 4/2021 | Inch et al. |
| 2021/0134042 A1 | 5/2021 | Streuber et al. |
| 2021/0168324 A1 | 6/2021 | Ngo |
| 2021/0192799 A1 | 6/2021 | Miura et al. |
| 2021/0247846 A1 | 8/2021 | Shriram et al. |
| 2021/0296003 A1 | 9/2021 | Baeurele |
| 2021/0311320 A1 | 10/2021 | Pike et al. |
| 2021/0312658 A1 | 10/2021 | Aoki et al. |
| 2021/0383594 A1 | 12/2021 | Tang et al. |
| 2022/0092862 A1 | 3/2022 | Faulkner et al. |
| 2022/0157036 A1 | 5/2022 | Chen et al. |
| 2022/0197382 A1 | 6/2022 | LeBEAU et al. |
| 2023/0252691 A1 | 8/2023 | Miura et al. |
| 2023/0324985 A1 | 10/2023 | Olson et al. |

OTHER PUBLICATIONS

International Search Report and Written Opinion for International Application No. PCT/US2021/064674, mailed Apr. 19, 2022, 13 pages.
Whitton M., et al., "Integrating Real and Virtual Objects in Virtual Environments," Aug. 24, 2007, Retrieved from http://web.archive.org/web/20070824035829/http://www.cs.unc.edu/~whitton/ExtendedCV/Papers/2005-HCII-Whitton-MixedEnvs.pdf, on May 3, 2017, 10 pages.
Hincapie-Ramos J.D., et al., "GyroWand: IMU-Based Raycasting for Augmented Reality Head-Mounted Displays," Proceedings of the 3rd Association for Computing Machinery (ACM) Symposium on Spatial User Interaction, Los Angeles, CA, USA, Aug. 8-9, 2015, pp. 89-98.
International Search Report and Written Opinion for International Application No. PCT/US2020/052976, mailed Dec. 11, 2020, 10 Pages.
Katz N., et al., "Extending Web Browsers with a Unity 3D-Based Virtual Worlds Viewer," IEEE Computer Society, Sep./Oct. 2011, vol. 15 (5), pp. 15-21.
Mayer S., et al., "The Effect of Offset Correction and Cursor on Mid-Air Pointing in Real and Virtual Environments," Proceedings of the 2018 CHI Conference on Human Factors in Computing Systems, Montreal, QC, Canada, Apr. 21-26, 2018, pp. 1-13.
Olwal A., et al., "The Flexible Pointer: An Interaction Technique for Selection in Augmented and Virtual Reality," Proceedings of ACM Symposium on User Interface Software and Technology (UIST), Vancouver, BC, Nov. 2-5, 2003, pp. 81-82.
Qiao X., et al., "Web AR: A Promising Future for Mobile Augmented Reality—State of the Art, Challenges, and Insights," Proceedings of the IEEE, Apr. 2019, vol. 107 (4), pp. 651-666.
Renner P., et al., "Ray Casting", Central Facility Labs [Online], [Retrieved on Apr. 7, 2020], 2 pages, Retrieved from the Internet: URL:https://www.techfak.uni-bielefeld.de/~tpfeiffe/lehre/VirtualReality/interaction/ray_casting.html.
Schweigert R., et al., "EyePointing: A Gaze-Based Selection Technique," Proceedings of Mensch and Computer, Hamburg, Germany, Sep. 8-11, 2019, pp. 719-723.
Srinivasa R.R., "Augmented Reality Adaptive Web Content," 13th IEEE Annual Consumer Communications & Networking Conference (CCNC), 2016, pp. 1-4.
Trademark U.S. Appl. No. 73/289,805, filed Dec. 15, 1980, 1 page.
Trademark U.S. Appl. No. 73/560,027, filed Sep. 25, 1985, 1 page.
Trademark U.S. Appl. No. 74/155,000, filed Apr. 8, 1991, 1 page.
Trademark U.S. Appl. No. 76/036,844, filed Apr. 28, 2000, 1 page.
"Unity Gets Toolkit for Common AR/VR Interactions," Unity XR interaction Toolkit Preview [Online], Dec. 19, 2019 [Retrieved on Apr. 7, 2020], 1 page, Retrieved from the Internet: URL: http://youtu.be/ZPhv4qmT9EQ.
Advisory Action mailed Apr. 6, 2021 for U.S. Appl. No. 16/720,699, filed Dec. 19, 2019, 3 pages.
Advisory Action mailed Feb. 22, 2022 for U.S. Appl. No. 16/720,699, filed Dec. 19, 2019, 3 pages.
Chen Y., et al., "Object Modeling by Registration of Multiple Range Images," Proceedings of the 1991 IEEE International Conference on Robotics and Automation, Apr. 1991, pp. 2724-2729, Retrieved from the internet: URL: https://graphics.stanford.edu/courses/cs348a-17-winter/Handouts/chen-medioni-align-rob91.pdf.
Final Office Action mailed Nov. 15, 2022 for U.S. Appl. No. 16/720,699, filed Dec. 19, 2019, 20 pages.
Final Office Action mailed Jan. 22, 2021 for U.S. Appl. No. 16/720,699, filed Dec. 19, 2019, 16 Pages.
Final Office Action mailed Dec. 7, 2021 for U.S. Appl. No. 16/720,699, filed Dec. 19, 2019, 17 pages.
International Search Report and Written Opinion for International Application No. PCT/US2023/033557, mailed Jan. 3, 2024, 12 pages.
Milborrow S., "Active Shape Models with Stasm," [Retrieved on Sep. 20, 2022], 3 pages, Retrieved from the internet: URL: http://www.milbo.users.sonic.net/stasm/.
Milborrow S., et al., "Active Shape Models with SIFT Descriptors and Mars," Department of Electrical Engineering, 2014, 8 pages, Retrieved from the internet: URL: http://www.milbo.org/stasm-files/active-shape-models-with-sift-and-mars.pdf.
MRPT: "RANSAC C++ Examples," 2014, 6 pages, Retrieved from the internet: URL: https://www.mrpt.org/tutorials/programming/maths-and-geometry/ransac-c-examples/.
Non-Final Office Action mailed Jul. 6, 2021 for U.S. Appl. No. 16/720,699, filed Dec. 19, 2019, 17 Pages.
Non-Final Office Action mailed Aug. 16, 2022 for U.S. Appl. No. 17/515,316, filed Oct. 29, 2021, 20 pages.
Non-Final Office Action mailed Aug. 18, 2020 for U.S. Appl. No. 16/720,699, filed Dec. 19, 2019, 15 Pages.
Non-Final Office Action mailed Apr. 25, 2022 for U.S. Appl. No. 16/720,699, filed Dec. 19, 2019, 17 Pages.
Response to Office Action mailed Nov. 18, 2020 for U.S. Appl. No. 16/720,699, filed Dec. 19, 2019, 9 pages.
Response to Office Action mailed Apr. 22, 2021 for U.S. Appl. No. 16/720,699, filed Dec. 19, 2019, 9 pages.
Response to Office Action mailed Mar. 22, 2021 for U.S. Appl. No. 16/720,699, filed Dec. 19, 2019, 9 pages.
Response to Office Action mailed Aug. 24, 2022 for U.S. Appl. No. 16/720,699, filed Dec. 19, 2019, 11 pages.

(56) References Cited

OTHER PUBLICATIONS

Response to Office Action mailed Oct. 6, 2021 for U.S. Appl. No. 16/720,699, filed Dec. 19, 2019, 11 pages.
Response to Office Action mailed Feb. 7, 2022 for U.S. Appl. No. 16/720,699, filed Dec. 19, 2019, 10 pages.
Response to Office Action mailed Mar. 7, 2022 for U.S. Appl. No. 16/720,699, filed Dec. 19, 2019, 12 pages.
Wikipedia: "Canny Edge Detector," [Retrieved on Sep. 20, 2022], 10 pages, Retrieved from the internet: URL: https://en.wikipedia.org/wiki/Canny_edge_detector.
Wikipedia: "Iterative Closest Point," [Retrieved on Sep. 20, 2022], 3 pages, Retrieved from the internet: URL: https://en.wikipedia.org/wiki/Iterative_closest_point.
International Preliminary Report on Patentability for International Application No. PCT/US2021/064674, mailed Jul. 6, 2023, 12 pages.
International Search Report and Written Opinion for International Application No. PCT/US2022/046196, mailed Jan. 25, 2023, 11 pages.
International Search Report and Written Opinion for International Application No. PCT/US2023/020446, mailed Sep. 14, 2023, 14 pages.

\* cited by examiner

PARTIAL PASSTHROUGH IN VIRTUAL REALITY

CROSS-REFERENCE TO RELATED APPLICATIONS

This application claims priority to U.S. Provisional Patent Application No. 63/129,486 titled "Partial Passthrough in Virtual Reality", filed Dec. 22, 2020, which is herein incorporated by reference in its entirety.

TECHNICAL FIELD

The present disclosure is directed to partial video passthrough in a virtual reality environment.

BACKGROUND

Virtual reality systems provide users the ability to experience different worlds, learn in new ways, and make better connections with others. These virtual reality systems can track user movements and translate them into interactions with "virtual objects" (i.e., computer-generated object representations appearing in a virtual environment.) For example, a virtual reality system can track a user's hands, translating a grab gesture as picking up a virtual object. While a user is seeing and interacting with virtual objects, the user's physical movements occur in the real world. In some situations, a virtual reality system can prevent the user from seeing part or all of the real world or the user can become distracted by the virtual objects, causing the user to inadvertently collide with real-world objects. In other cases, users may have a need to see what is happening in the real world. For example, users may need to interact with other people in a room or may need to interact with objects. However, this could involve many steps, including shutting off the virtual reality device, removing the device, etc.

BRIEF DESCRIPTION OF THE DRAWINGS

The techniques introduced here may be better understood by referring to the following Detailed Description in conjunction with the accompanying drawings, in which like reference numerals indicate identical or functionally similar elements.

DETAILED DESCRIPTION

Figure 1:
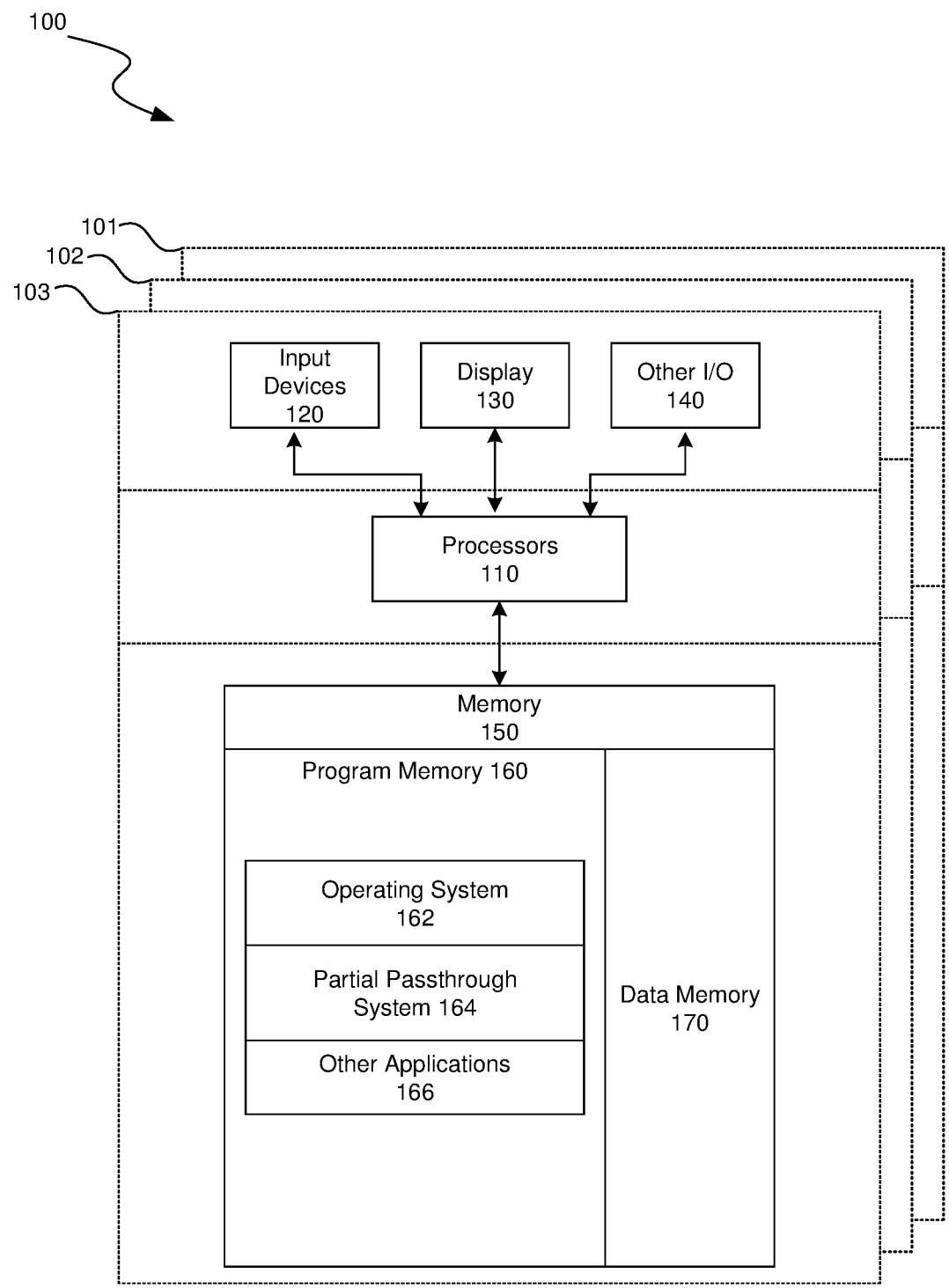
FIG. 1 is a block diagram illustrating an overview of devices on which some implementations of the present technology can operate.

Aspects of the present disclosure are directed to a partial passthrough system that allows users of a virtual reality device, such as a virtual reality headset, to view video of their environment without needing to remove or deactivate the virtual reality device or activate cumbersome controls. There are a variety of circumstances where users, interacting with a virtual reality environment, may need to see what is happening in at least part of the real world. For example, a user may be about to collide with a real-world object or may want to interact with a real-world object or person. However, existing virtual reality systems either require the user remove their virtual reality device or activate a control through a cumbersome set of menus to see the real world, unnecessarily removing them from the virtual reality experience. Therefore, a system is needed that can easily and/or automatically display a partial video feed of the user's environment, overlaid on a portion of the virtual environment, so the user can interact with real-world people and objects without needing to remove the virtual reality device or go through a series of UI controls or menus.

The partial passthrough system allows the user to view video of the real world when a trigger event occurs to initiate partial video passthrough. Examples of trigger events include when a user makes a particular gesture, when a user's hand exits a designated area, when a user's hand is within a threshold distance of a real-world object, when a user's hand is within a threshold distance of a physical surface, and combinations thereof. The partial video passthrough can provide a video feed of a portion of the user's actual environment overlaid on the virtual environment the user is viewing. Therefore, if the user needs to interact with objects in a vicinity of the user or with other people in the area, the user can cause a trigger event to access the video passthrough to see the user's environment in real time. Additional details on identifying a trigger event are provided below in relation to block 502 of FIG. 5.

In some cases, a user may designate a 'task zone' (e.g., an area on a desk) for interactions in a virtual environment. This task zone can be cleared of real-world objects to prevent the user's actions in the virtual environment from colliding with the real-world objects. This can include putting objects outside the task zone. However, the user may want to occasionally interact with these objects (e.g., take a sip of coffee). In this situation, a trigger event can include the user putting her hands through a virtual barrier defining the task zone or moving her hand within a threshold distance of the desk surface or another real-world object. In response to this trigger event, the partial passthrough system can automatically activate a partial video passthrough, allowing the user to see and interact with part of the real world, while otherwise maintaining the user's experience in the virtual reality environment. Additional details on implementations using a task zone are provided below in relation to FIG. 6.

The partial video passthrough can be provided using cameras, on the virtual reality device and/or in the user environment, to capture the video to be overlaid on the virtual environment. In various implementations, the partial passthrough system can also determine the position of the user's hand using input from one or more sensors attached to the user's hand(s) and/or by analyzing the captured video to determine a position of a hand within the environment. The partial passthrough system can then select a part of the captured video and overlay that part on the virtual environment, based on the position of the user's hand. Additional details on capturing a video feed, identifying a portion, aligning that portion with part of the virtual reality environment, and adding the portion as an overlay according to the alignment are provided below in relation to blocks 504-508 of FIG. 5.

In various implementations, the selected portion of the captured video, and the corresponding overlay area in the virtual reality environment can take various forms. In some implementations, referred to herein as "halo" implementations, the selected portion can be an area around a user's hand that caused the trigger event. Additional details on halo implementations are provided below in relation to FIG. 6. In other implementations, referred to herein as "flashlight" implementations, the selected portion can be an area determined by projecting a line out from the user's hand onto a real-world surface. Additional details on flashlight implementations are provided below in relation to FIG. 7.

Embodiments of the disclosed technology may include or be implemented in conjunction with an artificial reality system. Artificial reality or extra reality (XR) is a form of reality that has been adjusted in some manner before presentation to a user, which may include, e.g., virtual reality (VR), augmented reality (AR), mixed reality (MR), hybrid reality, or some combination and/or derivatives thereof. Artificial reality content may include completely generated content or generated content combined with captured content (e.g., real-world photographs). The artificial reality content may include video, audio, haptic feedback, or some combination thereof, any of which may be presented in a single channel or in multiple channels (such as stereo video that produces a three-dimensional effect to the viewer). Additionally, in some embodiments, artificial reality may be associated with applications, products, accessories, services, or some combination thereof, that are, e.g., used to create content in an artificial reality and/or used in (e.g., perform activities in) an artificial reality. The artificial reality system that provides the artificial reality content may be implemented on various platforms, including a head-mounted display (HMD) connected to a host computer system, a standalone HMD, a mobile device or computing system, a "cave" environment or other projection system, or any other hardware platform capable of providing artificial reality content to one or more viewers.

"Virtual reality" or "VR," as used herein, refers to an immersive experience where a user's visual input is controlled by a computing system. "Augmented reality" or "AR" refers to systems where a user views images of the real world after they have passed through a computing system. For example, a tablet with a camera on the back can capture images of the real world and then display the images on the screen on the opposite side of the tablet from the camera. The tablet can process and adjust or "augment" the images as they pass through the system, such as by adding virtual objects. "Mixed reality" or "MR" refers to systems where light entering a user's eye is partially generated by a computing system and partially composes light reflected off objects in the real world. For example, a MR headset could be shaped as a pair of glasses with a pass-through display, which allows light from the real world to pass through a waveguide that simultaneously emits light from a projector in the MR headset, allowing the MR headset to present virtual objects intermixed with the real objects the user can see. "Artificial reality," "extra reality," or "XR," as used herein, refers to any of VR, AR, MR, or any combination or hybrid thereof.

There are existing XR systems that provide virtual spaces. However, current XR systems do not have a mechanism for providing video passthrough overlaid on a portion of a virtual environment. Instead, a user must either use a series of menus or options to access a full video passthrough of the virtual environment (e.g., displaying only video to the user), deactivate the virtual reality device, or remove the virtual reality device. This may cause the user to lose progress on work completed or provide distractions to the user's work, causing unproductivity. The user also may also risk colliding with objects within the real-world environment ("the user's environment") while they work within the virtual environment. For example, while a user is working within the virtual environment, the user may accidentally collide with a water bottle or coffee cup and cause a spill, which could damage computing equipment, including the virtual reality computing system. In another example, the user may need to urgently speak with a person entering the room, and the user may not have the time to go through menus to access full video passthrough, deactivate the virtual reality device, or remove the virtual reality device.

Aspects of the invention provide improvements in the functioning of existing virtual reality computing systems. Cameras and/or sensors are used to identify an area within a user's environment indicated by the hand of the user. Then, a video stream of the indicated area is provided to the user via a virtual reality device as an overlay over a virtual environment the user is viewing, allowing the user to see both the virtual environment and the indicated area in the real world simultaneously. Showing the video stream as an overlay allows the user to accomplish tasks both in the virtual environment and outside the virtual environment (e.g., interact with objects or other people in the user's environment) without needing to deactivate and/or remove the virtual reality device.

One embodiment of the disclosed technology utilizes cameras and/or sensors to detect a position of the hand of the user within a dedicated workspace within the user environment. When the user's hand passes out of the dedicated workspace, the cameras and/or sensors detect a location of the user's hand within the user environment. Video of the area around the user's hand is then provided as an overlay for a virtual environment being viewed by the user in the virtual reality device, allowing the user to view and interact with objects outside of the dedicated work space within the user's environment.

A second embodiment of the disclosed technology utilizes cameras and/or sensors to detect the hand of the user. A user hand gesture is then detected, for example using image recognition technology or some other technology. When the hand gesture is detected, the cameras and/or sensors detect an area in the user environment the gesture is pointing to. Video for that area is provided as an overlay for the virtual environment via the virtual reality device.

Several implementations are discussed below in more detail in reference to the figures. FIG. 1 is a block diagram illustrating an overview of devices on which some implementations of the disclosed technology can operate. The devices can comprise hardware components of a computing system 100 that provide a partial passthrough video feed to a virtual reality device. In various implementations, computing system 100 can include a single computing device 103 or multiple computing devices (e.g., computing device 101, computing device 102, and computing device 103) that communicate over wired or wireless channels to distribute processing and share input data. In some implementations, computing system 100 can include a stand-alone headset capable of providing a computer created or augmented experience for a user without the need for external processing or sensors. In other implementations, computing system 100 can include multiple computing devices such as a headset and a core processing component (such as a console, mobile device, or server system) where some processing operations are performed on the headset and others are offloaded to the core processing component. Example headsets are described below in relation to FIGS. 2A and 2B. In some implementations, position and environment data can be gathered only by sensors incorporated in the headset device, while in other implementations one or more of the non-headset computing devices can include sensor components that can track environment or position data.

Computing system 100 can include one or more processor(s) 110 (e.g., central processing units (CPUs), graphical processing units (GPUs), holographic processing units (HPUs), etc.) Processors 110 can be a single processing unit or multiple processing units in a device or distributed across multiple devices (e.g., distributed across two or more of computing devices 101-103).

Computing system 100 can include one or more input devices 120 that provide input to the processors 110, notifying them of actions. The actions can be mediated by a hardware controller that interprets the signals received from the input device and communicates the information to the processors 110 using a communication protocol. Each input device 120 can include, for example, a mouse, a keyboard, a touchscreen, a touchpad, a wearable input device (e.g., a haptics glove, a bracelet, a ring, an earring, a necklace, a watch, etc.), a camera (or other light-based input device, e.g., an infrared sensor), a microphone, or other user input devices.

Processors 110 can be coupled to other hardware devices, for example, with the use of an internal or external bus, such as a PCI bus, SCSI bus, or wireless connection. The processors 110 can communicate with a hardware controller for devices, such as for a display 130. Display 130 can be used to display text and graphics. In some implementations, display 130 includes the input device as part of the display, such as when the input device is a touchscreen or is equipped with an eye direction monitoring system. In some implementations, the display is separate from the input device. Examples of display devices are: an LCD display screen, an LED display screen, a projected, holographic, or augmented reality display (such as a heads-up display device or a head-mounted device), and so on. Other I/O devices 140 can also be coupled to the processor, such as a network chip or card, video chip or card, audio chip or card, USB, firewire or other external device, camera, printer, speakers, CD-ROM drive, DVD drive, disk drive, etc.

Computing system 100 can include a communication device capable of communicating wirelessly or wire-based with other local computing devices or a network node. The communication device can communicate with another device or a server through a network using, for example, TCP/IP protocols. Computing system 100 can utilize the communication device to distribute operations across multiple network devices.

The processors 110 can have access to a memory 150, which can be contained on one of the computing devices of computing system 100 or can be distributed across of the multiple computing devices of computing system 100 or other external devices. A memory includes one or more hardware devices for volatile or non-volatile storage, and can include both read-only and writable memory. For example, a memory can include one or more of random access memory (RAM), various caches, CPU registers, read-only memory (ROM), and writable non-volatile memory, such as flash memory, hard drives, floppy disks, CDs, DVDs, magnetic storage devices, tape drives, and so forth. A memory is not a propagating signal divorced from underlying hardware; a memory is thus non-transitory. Memory 150 can include program memory 160 that stores programs and software, such as an operating system 162, partial passthrough system 164, and other application programs 166. Memory 150 can also include data memory 170 that can include virtual reality environment data, configuration data, settings, user options or preferences, etc., which can be provided to the program memory 160 or any element of the computing system 100.

Some implementations can be operational with numerous other computing system environments or configurations. Examples of computing systems, environments, and/or configurations that may be suitable for use with the technology include, but are not limited to, XR headsets, personal computers, server computers, handheld or laptop devices, cellular telephones, wearable electronics, gaming consoles, tablet devices, multiprocessor systems, microprocessor-based systems, set-top boxes, programmable consumer electronics, network PCs, minicomputers, mainframe computers, distributed computing environments that include any of the above systems or devices, or the like.

Figure 2A:
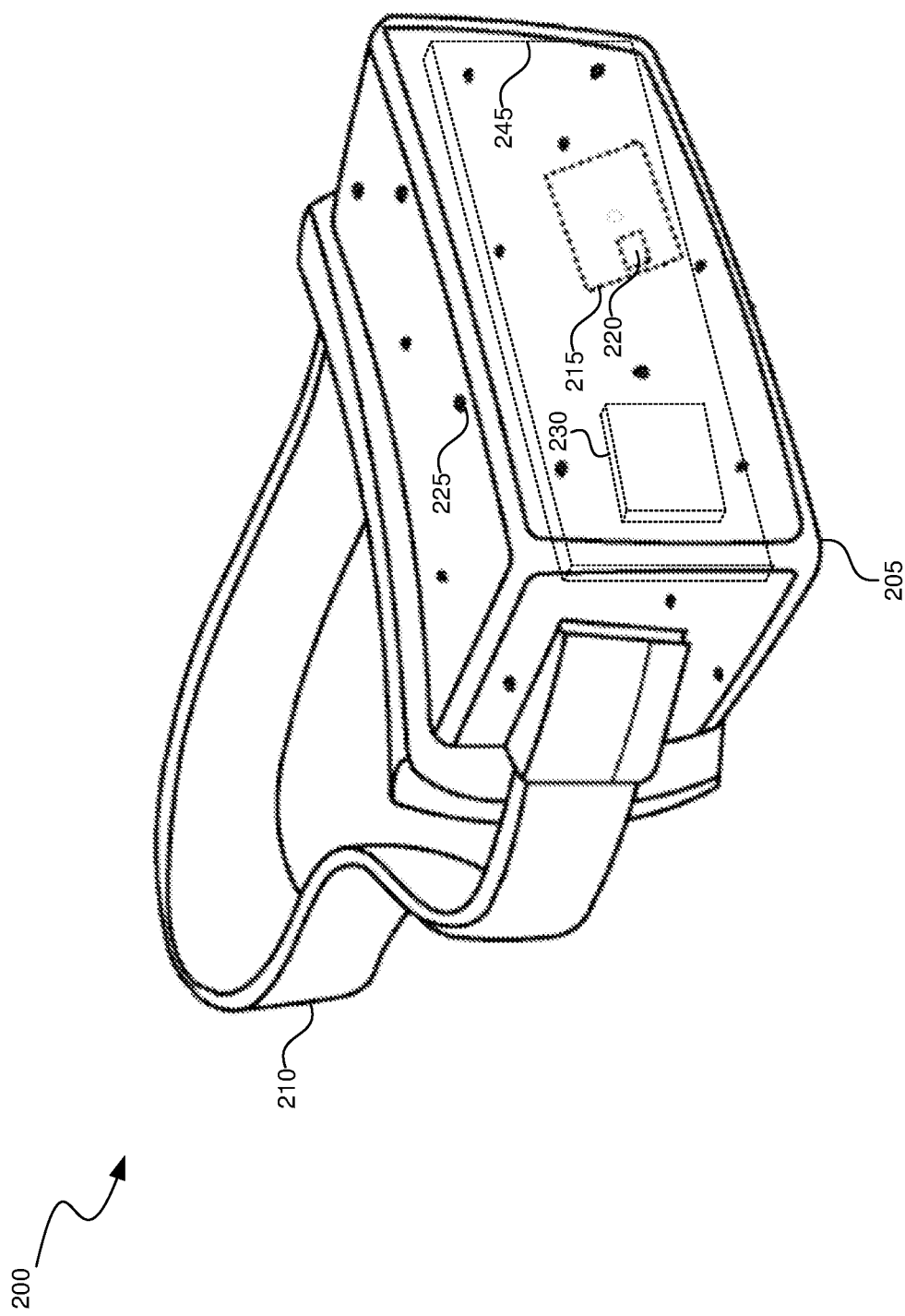
FIG. 2A is a wire diagram illustrating a virtual reality headset which can be used in some implementations of the present technology.

FIG. 2A is a wire diagram of a virtual reality head-mounted display (HMD) 200, in accordance with some embodiments. The HMD 200 includes a front rigid body 205 and a band 210. The front rigid body 205 includes one or more electronic display elements of an electronic display 245, an inertial motion unit (IMU) 215, one or more position sensors 220, locators 225, and one or more compute units 230. The position sensors 220, the IMU 215, and compute units 230 may be internal to the HMD 200 and may not be visible to the user. In various implementations, the IMU 215, position sensors 220, and locators 225 can track movement and location of the HMD 200 in the real world and in a virtual environment in three degrees of freedom (3DoF) or six degrees of freedom (6DoF). For example, the locators 225 can emit infrared light beams which create light points on real objects around the HMD 200. As another example, the IMU 215 can include e.g., one or more accelerometers, gyroscopes, magnetometers, other non-camera-based position, force, or orientation sensors, or combinations thereof. One or more cameras (not shown) integrated with the HMD 200 can detect the light points. Compute units 230 in the HMD 200 can use the detected light points to extrapolate position and movement of the HMD 200 as well as to identify the shape and position of the real objects surrounding the HMD 200.

The electronic display 245 can be integrated with the front rigid body 205 and can provide image light to a user as dictated by the compute units 230. In various embodiments, the electronic display 245 can be a single electronic display or multiple electronic displays (e.g., a display for each user eye). Examples of the electronic display 245 include: a liquid crystal display (LCD), an organic light-emitting diode (OLED) display, an active-matrix organic light-emitting diode display (AMOLED), a display including one or more quantum dot light-emitting diode (QOLED) sub-pixels, a projector unit (e.g., microLED, LASER, etc.), some other display, or some combination thereof.

In some implementations, the HMD 200 can be coupled to a core processing component such as a personal computer (PC) (not shown) and/or one or more external sensors (not shown). The external sensors can monitor the HMD 200 (e.g., via light emitted from the HMD 200) which the PC can use, in combination with output from the IMU 215 and position sensors 220, to determine the location and movement of the HMD 200.

Figure 2B:
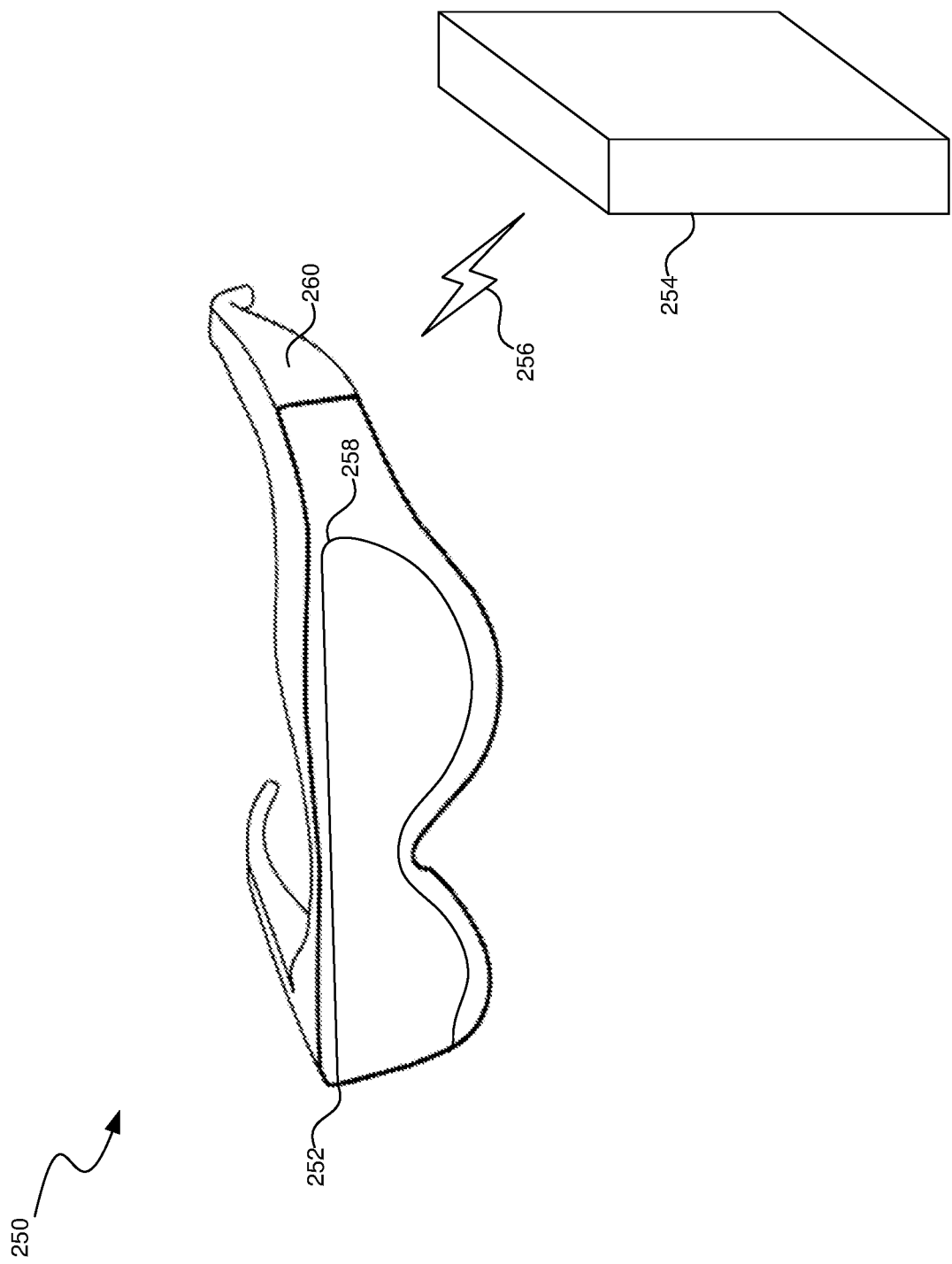
FIG. 2B is a wire diagram illustrating a mixed reality headset which can be used in some implementations of the present technology.

FIG. 2B is a wire diagram of a mixed reality HMD system 250 which includes a mixed reality HMD 252 and a core processing component 254. The mixed reality HMD 252 and the core processing component 254 can communicate via a wireless connection (e.g., a 60 GHz link) as indicated by link 256. In other implementations, the mixed reality system 250 includes a headset only, without an external compute device or includes other wired or wireless connections between the mixed reality HMD 252 and the core processing component 254. The mixed reality HMD 252 includes a pass-through display 258 and a frame 260. The frame 260 can house various electronic components (not shown) such as light projectors (e.g., LASERs, LEDs, etc.), cameras, eye-tracking sensors, MEMS components, networking components, etc.

The projectors can be coupled to the pass-through display 258, e.g., via optical elements, to display media to a user. The optical elements can include one or more waveguide assemblies, reflectors, lenses, mirrors, collimators, gratings, etc., for directing light from the projectors to a user's eye. Image data can be transmitted from the core processing component 254 via link 256 to HMD 252. Controllers in the HMD 252 can convert the image data into light pulses from the projectors, which can be transmitted via the optical elements as output light to the user's eye. The output light can mix with light that passes through the display 258, allowing the output light to present virtual objects that appear as if they exist in the real world.

Similarly to the HMD 200, the HMD system 250 can also include motion and position tracking units, cameras, light sources, etc., which allow the HMD system 250 to, e.g., track itself in 3DoF or 6DoF, track portions of the user (e.g., hands, feet, head, or other body parts), map virtual objects to appear as stationary as the HMD 252 moves, and have virtual objects react to gestures and other real-world objects.

Figure 2C:
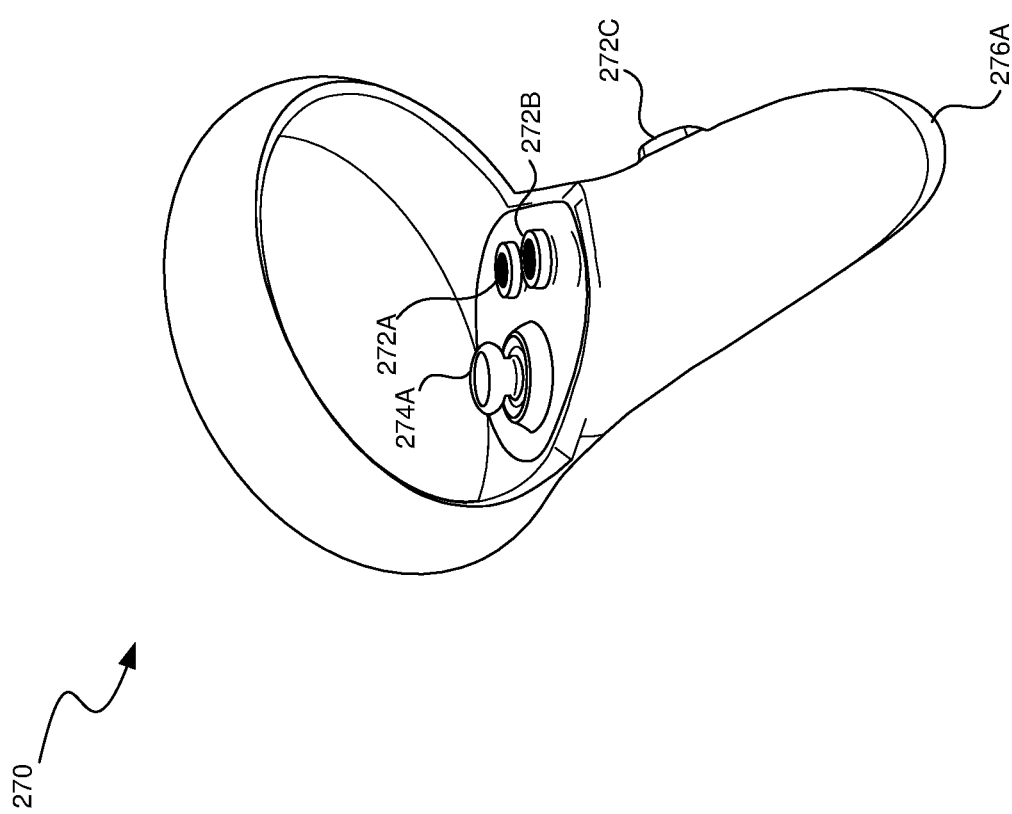
FIG. 2C illustrates controllers, which, in some implementations, a user can hold in one or both hands to interact with an artificial reality environment.

FIG. 2C illustrates controllers 270, which, in some implementations, a user can hold in one or both hands to interact with an artificial reality environment presented by the HMD 200 and/or HMD 250. The controllers 270 can be in communication with the HMDs, either directly or via an external device (e.g., core processing component 254). The controllers can have their own IMU units, position sensors, and/or can emit further light points. The HMD 200 or 250, external sensors, or sensors in the controllers can track these controller light points to determine the controller positions and/or orientations (e.g., to track the controllers in 3DoF or 6DoF). The compute units 230 in the HMD 200 or the core processing component 254 can use this tracking, in combination with IMU and position output, to monitor hand positions and motions of the user. The controllers can also include various buttons (e.g., buttons 272A-F) and/or joysticks (e.g., joysticks 274A-B), which a user can actuate to provide input and interact with objects.

In various implementations, the HMD 200 or 250 can also include additional subsystems, such as an eye tracking unit, an audio system, various network components, etc. To monitor indications of user interactions and intentions. For example, in some implementations, instead of or in addition to controllers, one or more cameras included in the HMD 200 or 250, or from external cameras, can monitor the positions and poses of the user's hands to determine gestures and other hand and body motions.

Figure 3:
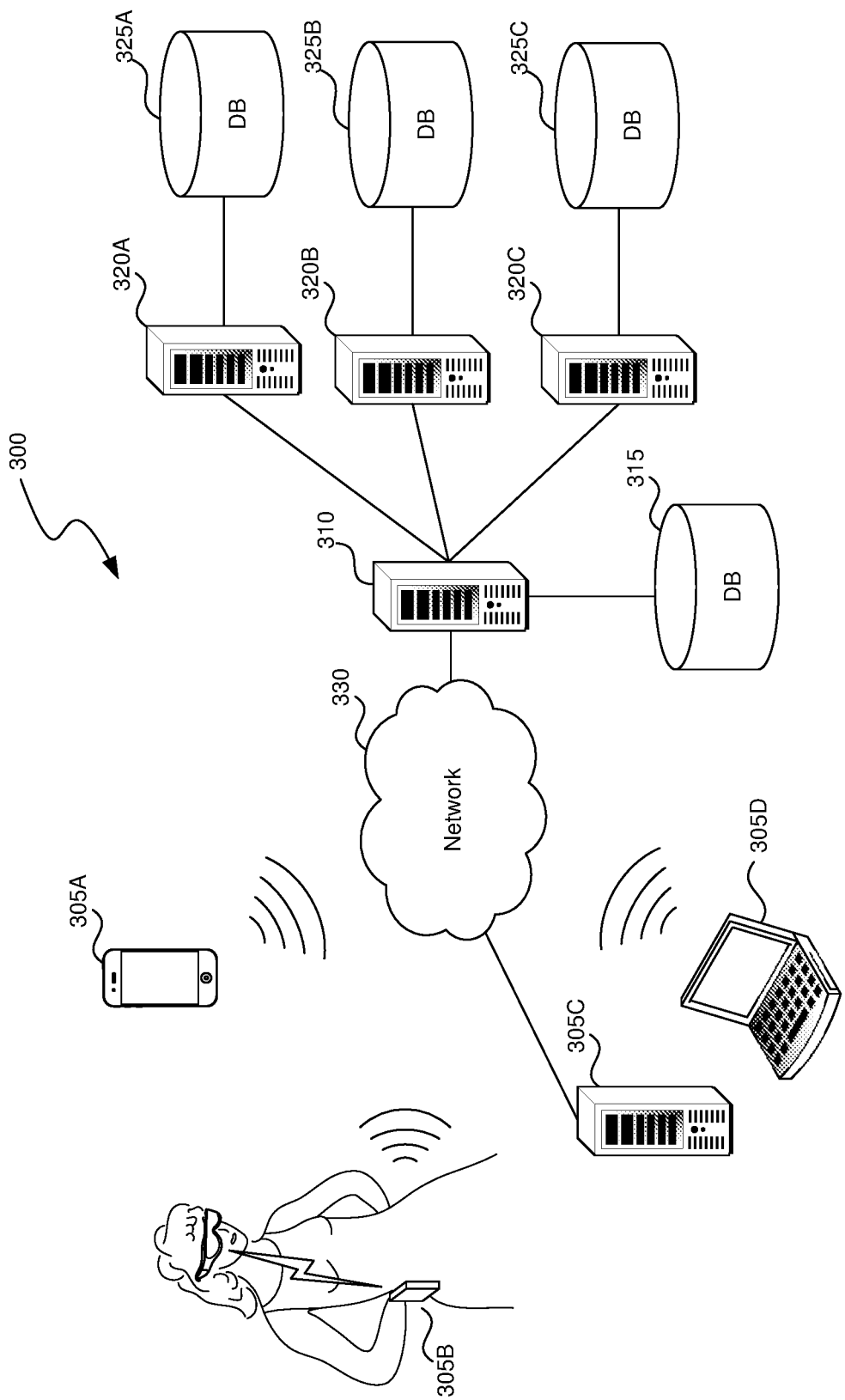
FIG. 3 is a block diagram illustrating an overview of an environment in which some implementations of the present technology can operate.

FIG. 3 is a block diagram illustrating an overview of an environment 300 in which some implementations of the disclosed technology can operate. Environment 300 can include one or more client computing devices 305A-D, examples of which can include computing system 100. In some implementations, some of the client computing devices (e.g., client computing device 305B) can be the HMD 200 or the HMD system 250. Client computing devices 305 can operate in a networked environment using logical connections through network 330 to one or more remote computers, such as a server computing device.

In some implementations, server 310 can be an edge server which receives client requests and coordinates fulfillment of those requests through other servers, such as servers 320A-C. Server computing devices 310 and 320 can comprise computing systems, such as computing system 100. Though each server computing device 310 and 320 is displayed logically as a single server, server computing devices can each be a distributed computing environment encompassing multiple computing devices located at the same or at geographically disparate physical locations.

Client computing devices 305 and server computing devices 310 and 320 can each act as a server or client to other server/client device(s). Server 310 can connect to a database 315. Servers 320A-C can each connect to a corresponding database 325A-C. As discussed above, each server 310 or 320 can correspond to a group of servers, and each of these servers can share a database or can have their own database. Though databases 315 and 325 are displayed logically as single units, databases 315 and 325 can each be a distributed computing environment encompassing multiple computing devices, can be located within their corresponding server, or can be located at the same or at geographically disparate physical locations.

Network 330 can be a local area network (LAN), a wide area network (WAN), a mesh network, a hybrid network, or other wired or wireless networks. Network 330 may be the Internet or some other public or private network. Client computing devices 305 can be connected to network 330 through a network interface, such as by wired or wireless communication. While the connections between server 310 and servers 320 are shown as separate connections, these connections can be any kind of local, wide area, wired, or wireless network, including network 330 or a separate public or private network.

Figure 4:
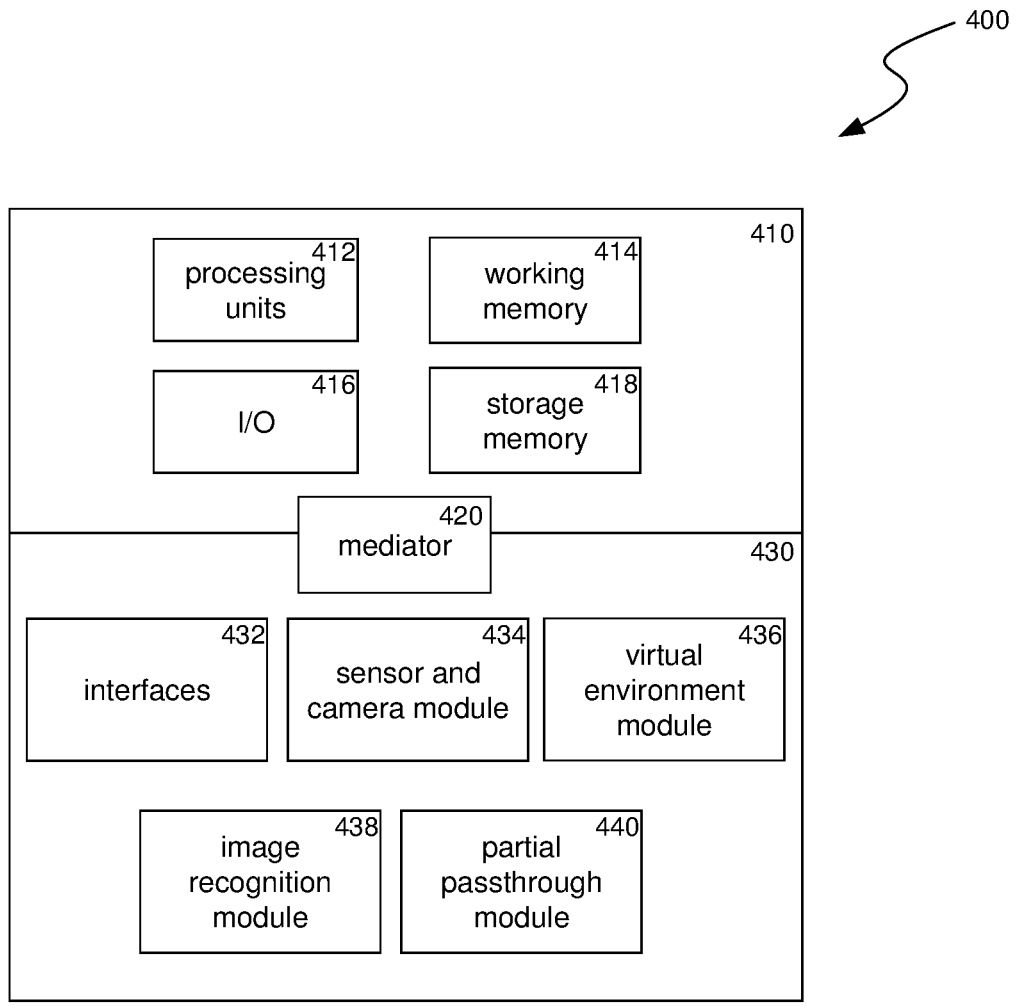
FIG. 4 is a block diagram illustrating components which, in some implementations, can be used in a system employing the disclosed technology.

FIG. 4 is a block diagram illustrating components 400 which, in some implementations, can be used in a system employing the disclosed technology. Components 400 can be included in one device of computing system 100 or can be distributed across multiple of the devices of computing system 100. The components 400 include hardware 410, mediator 420, and specialized components 430. As discussed above, a system implementing the disclosed technology can use various hardware including processing units 412, working memory 414, input and output devices 416 (e.g., cameras, displays, IMU units, network connections, etc.), and storage memory 418. In various implementations, storage memory 418 can be one or more of: local devices, interfaces to remote storage devices, or combinations thereof. For example, storage memory 418 can be one or more hard drives or flash drives accessible through a system bus or can be a cloud storage provider (such as in storage 315 or 325) or other network storage accessible via one or more communications networks. In various implementations, components 400 can be implemented in a client computing device such as client computing devices 305 or on a server computing device, such as server computing device 310 or 320.

Mediator 420 can include components which mediate resources between hardware 410 and specialized components 430. For example, mediator 420 can include an operating system, services, drivers, a basic input output system (BIOS), controller circuits, or other hardware or software systems.

Specialized components 430 can include software or hardware configured to perform operations for providing partial video passthrough in a virtual reality environment. Specialized components 430 can include a sensor and camera module 434, a virtual environment module 436, an image recognition module 438, a partial passthrough module 440, and components and APIs which can be used for providing user interfaces, transferring data, and controlling the specialized components, such as interfaces 432. In some implementations, components 400 can be in a computing system that is distributed across multiple computing devices or can be an interface to a server-based application executing one or more of specialized components 430. Although depicted as separate components, specialized components 430 may be logical or other nonphysical differentiations of functions and/or may be submodules or code-blocks of one or more applications.

Sensor and camera module 434 can receive data from one or more sensors, such as radar sensors, LIDAR sensors, ultrasonic sensors, other forms of range finding sensors, depth sensors, and other types of sensors, and/or one or more cameras. This data is then provided to one or more other modules of the specialized components 430. In some implementations, the sensor and camera module 434 can execute one or more functions to perform formatting on any raw received data from the one or more sensors and/or cameras into a format that other specialized components 430 can use for performing each component's respective functionality. Additional details on capturing data from sensors and/or cameras are provided below in relation to block 502 of FIG. 5.

Virtual environment module 436 can provide a virtual environment to a user (e.g., a user of a virtual reality device, such as HMD 200). In various implementations, the virtual environment illustrates virtual objects. For example, the virtual environment can include product or logo designs, blueprints, social interaction platforms, games, work applications, or any other type of content. The virtual environment module may also allow for manipulation of the virtual objects. For example, in various implementations, the user may zoom in or out of the virtual environment, may transition between multiple different views of the same virtual environment or different virtual environments, may select and manipulate (e.g., position, size, modify, etc.) virtual objects in the virtual environment, and perform other operations to manipulate the virtual environment. In some implementations, the virtual environment module 436 provides access to the virtual environment to the partial passthrough module 440 and receives, from the partial passthrough module 440, video data to overlay on the virtual environment in a location defined by the partial passthrough module 440.

Image recognition module 438 can receive video data from the sensor and camera module 434 and can analyze the video data using one or more image recognition algorithms and/or machine learning models to detect the user's hand and/or other objects within the user's real-world environment. The image recognition module 438 can provide any recognized objects and the locations of recognized objects in the user's real-world environment to the partial passthrough module 440. Additional details on recognizing objects from sensor and video data are provided below in relation to blocks 502-504 of FIG. 5.

Partial passthrough module 440 can receive access to the virtual environment from the virtual environment module 436, the location of any recognized objects in the user's real-world environment from the image recognition module 438, and the sensor and/or camera data from the sensor and camera module 434. Using these inputs, the partial passthrough module 440 can determine what video data should be displayed as the partial passthrough video feed. The video data to be displayed as the partial passthrough video feed is determined based on a recognized object (a hand, a person, or another object) and a desired size of a passthrough area (determined as described below with regards to block 504 of FIG. 5). Once the hand passthrough video feed is determined, the partial passthrough module 440 determines a location within the virtual environment that corresponds to the location of the hand passthrough video feed in the user's real-world environment. The partial passthrough module 440 then passes the hand passthrough video feed to the virtual environment module 436, which displays the hand passthrough video feed over the virtual environment at the location in the virtual environment corresponding to the location of the identified object in the user's real-world environment. Additional details on providing a partial video passthrough are provided below in relation to blocks 504-508 of FIG. 5.

Those skilled in the art will appreciate that the components illustrated in FIGS. 1-4 described above, and in each of the flow diagrams discussed below, may be altered in a variety of ways. For example, the order of the logic may be rearranged, substeps may be performed in parallel, illustrated logic may be omitted, other logic may be included, etc. In some implementations, one or more of the components described above can execute one or more of the processes described below.

Figure 5:
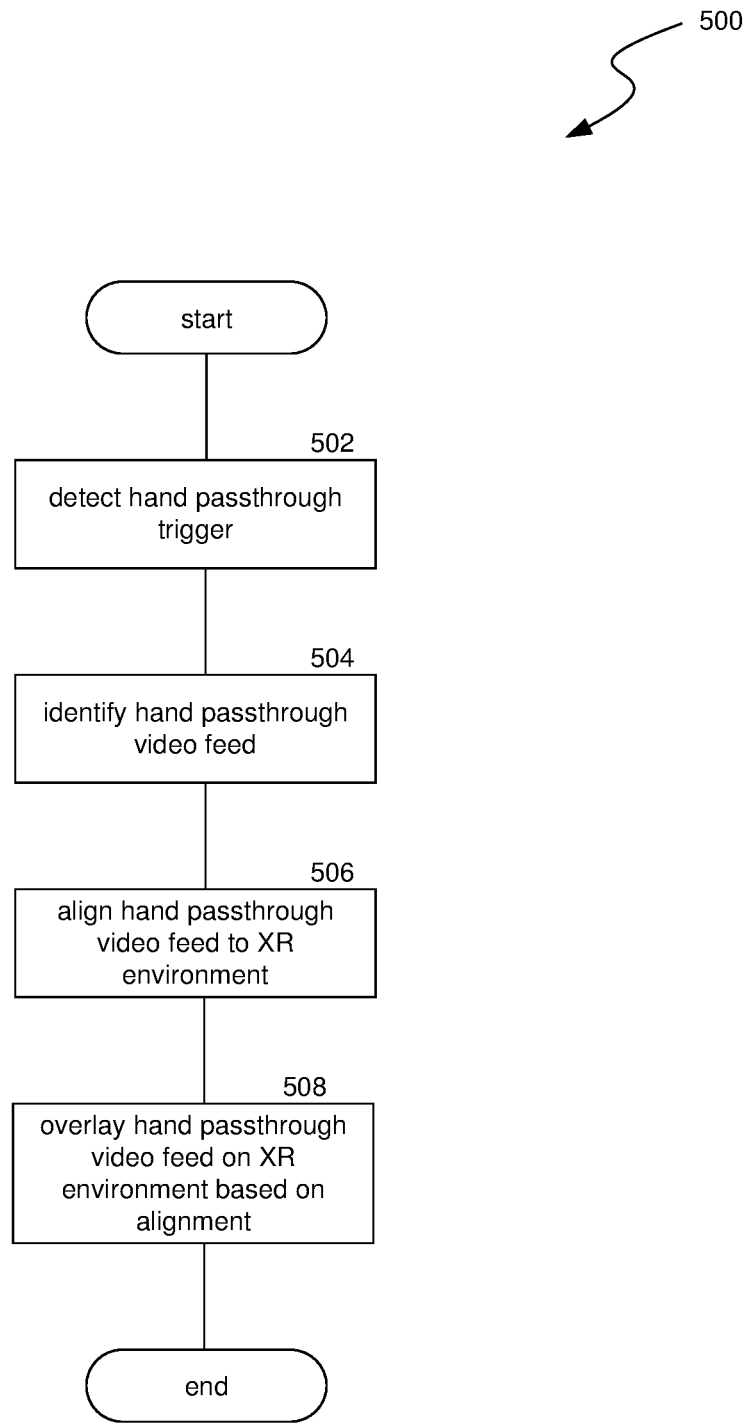
FIG. 5 is a flow diagram illustrating a process used in some implementations of the present technology for providing partial video passthrough for a virtual reality device.

FIG. 5 is a flow diagram illustrating a process 500 used in some implementations for providing partial video passthrough for a virtual reality device. In some implementations, process 500 can be initiated upon startup of a virtual reality device and run as a background process while the user operates the virtual reality device. In other implementations, the process 500 is initiated based on a particular context. For example, the process 500 may start only when the user is sitting at a desk or other workstation or when the user actuates an input mechanism. In some implementations, the input mechanism may be a physical input mechanism, such as a button or switch on the HMD 200. In other implementations, the input mechanism may be a software input mechanism, such as the selection of an element of a graphical user interface or the selection of an option from a series of menus.

At block 502, the process 500 detects a hand passthrough trigger event. In some implementations of the technology, the hand passthrough trigger event is detected based on input from one or more cameras and/or sensors (such as depth sensors, infrared sensors, LIDAR sensors, and other forms of sensors). The hand passthrough trigger event may be, in some implementations of the technology, a detection of a hand of the user leaving a dedicated workspace, such as a defined area on a desktop, a defined three-dimensional space in front of the user, or another workspace. For example, a workspace may be defined as a volume with particular dimensions on a desktop of the user, such as three feet in length, two feet in width, and one foot in height. While the user's hands are within the workspace, a virtual reality system displays a virtual environment. When one of the user's hands leaves this defined workspace, as detected by a camera and/or one or more sensors, the process 500 detects this as a hand passthrough trigger event. In other implementations, if the hand leaves the workspace and is within a threshold distance of the desk surface (e.g., 3 inches, 6 inches, 1 foot, etc.), a hand passthrough trigger event is detected, but if the user's hand leaves the workspace above the threshold distance from the workspace surface, no hand passthrough event trigger is detected.

In other implementations of the technology, the hand passthrough trigger event is a hand gesture made by the user. For example, the user may make a gesture such as pointing a fist outward from their body, pointing an open palm outward from their body, closing the hand and pointing it outward from their body as if holding a flashlight, pointing an index finger in a direction and pointing a thumb upwards (a "hand gun" gesture), making a pinching motion with two or more fingers and/or the thumb, pointing with only one finger or the thumb at a location, or another hand gesture. When cameras detect this hand gesture using image recognition technology, a hand passthrough trigger event is detected.

In yet other implementations of the technology, the process 500 can detect a hand passthrough trigger based on a prediction that a collision will occur between the user's hand (or other body part) and an object within the user's environment. For example, one or more of the cameras and/or sensors may identify that a user's hand is about to collide with a water bottle on a desktop. The one or more cameras and/or sensors may use a kinematic model to track hand velocity and trajectory in order to determine if a hand is about collide with the object. If the potential collision is detected, process 500 can detect the hand passthrough trigger event.

In some implementations of the technology, process 500 can detect a hand passthrough trigger based on the user's hand being within a threshold distance (e.g., 2 inches, 6 inches, 8 inches, etc.) of a real-world object. For example, one or more of the cameras and/or sensors may identify that a user's hand has moved to within 6 inches of a coffee mug, causing process 500 to detect the trigger event.

In further implementations of the technology, the hand passthrough trigger event may be a user activating a control, such as a button or switch on the virtual reality device or an associated controller, or may be detected in response to a voice command from a user being detected by one or more microphones.

At block 504, the process 500 identifies a hand passthrough video feed. In some implementations of the technology, the process 500 identifies a passthrough area surrounding a hand of the user to allow for partial video passthrough. For example, the passthrough area surrounding the user's hand may be a "halo" or other circular or oval shape that surrounds the hand, or an area defined by an offset from outer contours of a user's hand, and allows the user to view objects within the immediate vicinity of the hand. In other implementations the passthrough area may be a "flashlight," or a projected circle or oval that allows the user to view objects within the user environment based on where the user is pointing their hand. In further implementations, the process 500 may only identify particular objects to overlay into the virtual environment, such as an object the user's hand may potentially collide with or that is in the vicinity of the user's hand in the user's environment.

The process 500 identifies a hand passthrough video feed by identifying, using image recognition technology, a controlling hand and/or triggering object(s). Once the hand or objects are identified, the process 500 determines a size of the passthrough area. The size of the passthrough area may be fixed or may be variable. If the size is fixed, the size may be preset "out of the box," or before the user operates the virtual reality system for the first time or may be set as a user option. If the size is variable, an environmental context may be used to set the size. For example, the size of the passthrough area may be determined based on a distance between the hand and one or more objects that would be shown in the passthrough area, and may grow or shrink in size as the user's hand approaches the object(s). For example, the radius of a flashlight passthrough circle projected on a real-world surface may be proportional to a distance between the user's hand and that surface. The size of the passthrough area may also be controllable using one or more hand gestures. For example, a user may use two hands to make a stretching or widening gesture to increase the size of the area or the radius of a flashlight passthrough circle or the size of the halo area around the user's hand may be proportional to a distance between the user's hands.

If the hand passthrough video feed is a flashlight passthrough video feed, the process 500 projects a ray from the user's hand in a direction, such as straight out, curved, down, or straight down. A contact point is identified with a real-world object, such as a coffee cup or a person, and the hand passthrough video feed is taken from the area around the contact point. If the hand passthrough video feed is triggered as a user's hand is approaching contact with an object, the hand passthrough video feed can be taken from video of the object and, optionally, an area within a threshold distance around the object.

At block 506, the process 500 aligns the hand passthrough video feed of the passthrough area with the virtual environment. Process 500 can accomplish this by matching coordinates associated with the hand passthrough video feed to coordinates in the virtual environment. In some implementations, this includes matching the hand passthrough video feed to a determined location of the user's hand in the virtual environment. The process 500 can determine the location of the user's hand in the user environment using data from a combination of one or more cameras and one or more sensors. Next, the process 500 can determine a location within the virtual environment corresponding to the position of the hand or object in the user environment. In other implementations, the process 500 can match a location of objects in the user's environment that will be passed through for overlay on the virtual environment with a corresponding location in the virtual environment. Based on the matching of the location of the user's hand or an object in the user environment to a location within the virtual environment, the process 500 can accurately align the hand passthrough video feed in the virtual environment. By aligning the hand passthrough video feed with the virtual environment, the hand passthrough video feed allows the user to have a depth-accurate view of the user environment to aid in interacting with objects. The process 500 continues to track the location of the hand and/or objects and constantly provide the hand passthrough video feed in different portions of the virtual environment.

At block 508, the process 500 overlays the hand passthrough video feed (determined at block 504) on the virtual environment based on the alignment performed in block 506. The hand passthrough video feed is provided within the passthrough area so the user may interact with objects and/or other people. The portion of the virtual environment that would normally be displayed at the location of the passthrough area is replaced by the hand passthrough video feed. The hand passthrough video feed can be presented unmodified or as partially opaque, allowing the user to "see through" to the virtual environment while being able to view part of the real world. In some implementations, the edge(s) of the hand passthrough video feed could "fade," or gradually transition using a video effect, into the virtual environment.

Figure 6:
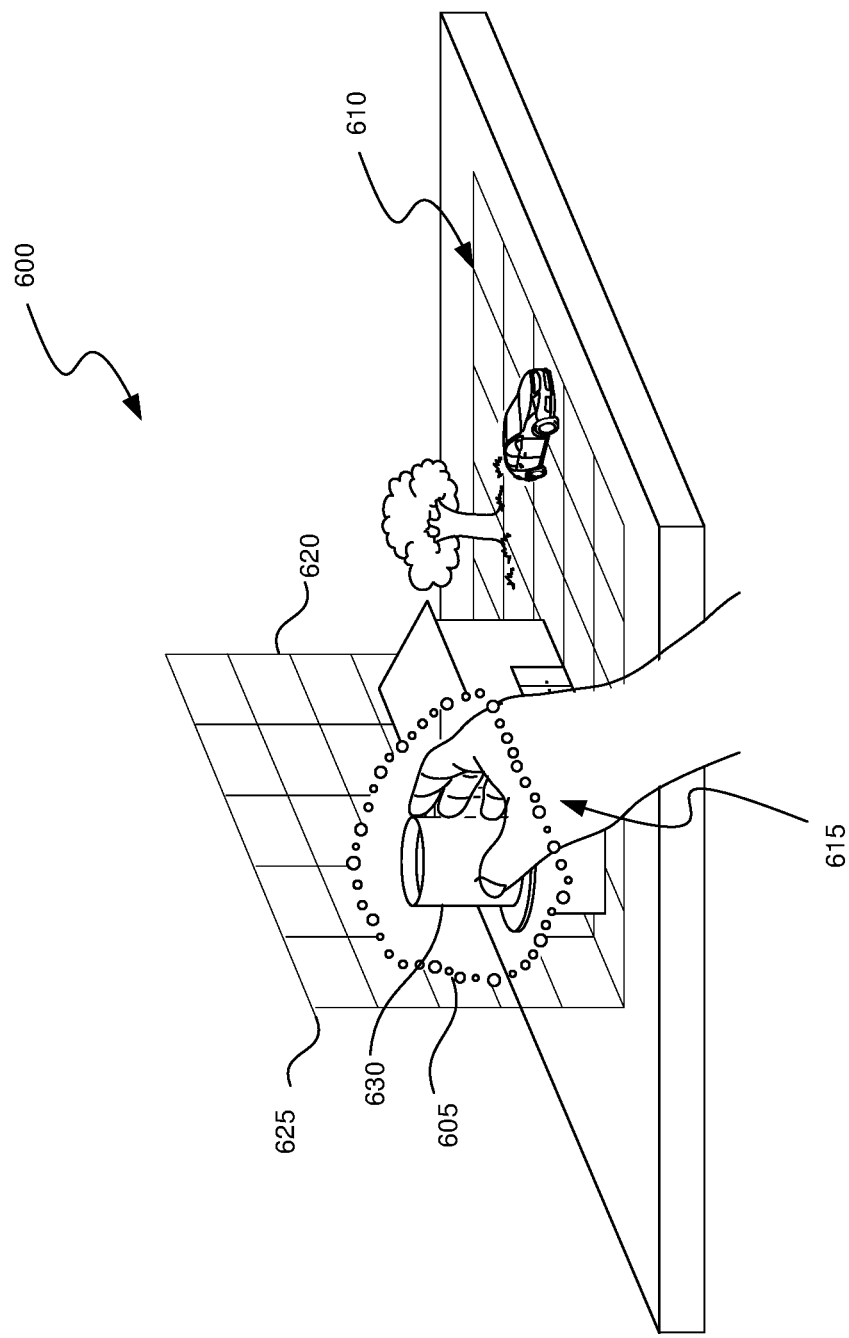
FIG. 6 is a conceptual diagram illustrating an example of halo partial video passthrough being overlaid on a virtual environment in some implementations employing the disclosed technology.

FIG. 6 is a conceptual diagram illustrating an example 600 of halo partial video passthrough being overlaid on a virtual environment 610 in some implementations employing the disclosed technology. In the example 600, a hand 615 of the user passes through a virtual wall 620 of the virtual environment 610 below a defined threshold height 625. When the hand 615 passes through the virtual wall 620 of the virtual environment below the defined threshold height 625, a hand passthrough event trigger is detected as described at block 502. Then, the process 500 determines what will be included in the hand passthrough video feed, such as the size of the halo of the passthrough 605, as described at block 504. In example 600, the size of the halo is defined as an area offset from both A) the contours of the hand 615 and B) an object 630 that the hand 615 is within a threshold distance of. The process 500 aligns the hand passthrough video feed within the virtual environment by receiving data from one or more cameras and/or sensors as described with regards to block 506 of Figure. The process 500 then displays object 630, such as a coffee cup, in the user's real-world environment overlaid on the virtual environment 610 in the halo of the partial passthrough 605.

Figure 7:
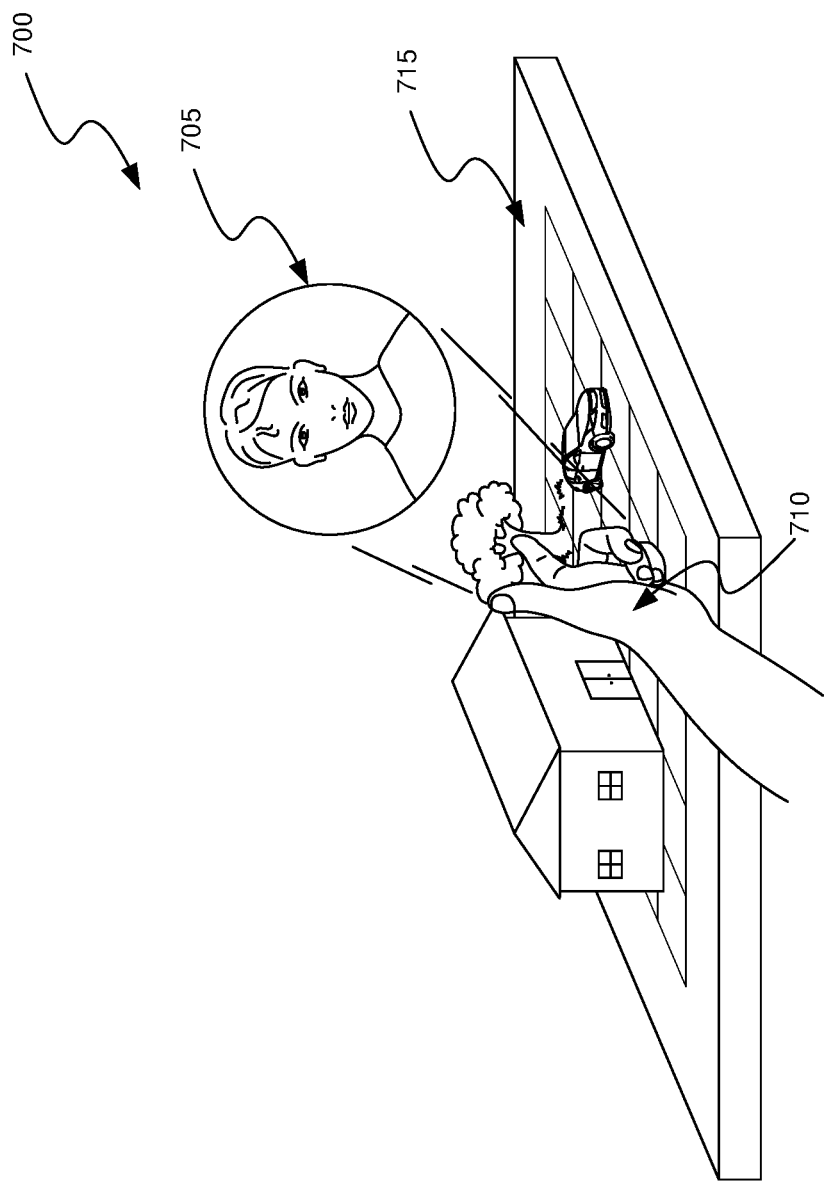
FIG. 7 is a conceptual diagram illustrating an example of flashlight partial video passthrough being overlaid on a virtual environment in some implementations employing the disclosed technology.

FIG. 7 is a conceptual diagram illustrating an example 700 of a flashlight partial video passthrough 705 being overlaid on a virtual environment 715 in some implementations employing the disclosed technology. In example 700, one or more sensors and/or cameras detect a hand gesture of a hand 710 of the user. The hand gesture of the hand 710 of the user is detected as a hand passthrough event. When the hand gesture is detected, the process 500 determines a location (illustrated by the flashlight partial passthrough 705) in the user's real-world environment that the hand gesture is pointing to. For example, as discussed with regards to block 504 of FIG. 5, the process 500 can identify a contact point of a "ray" extended out from the user's hand 710 and provide a video feed of the location of the contact point and an area around the contact point as the hand passthrough video feed. In example 700, there is a real-world person in the area the user is pointing at. The process 500 aligns the hand passthrough video feed with a corresponding location in the virtual environment. As discussed with regards to block 506 of FIG. 5, the process 500 aligns the hand passthrough video feed by identifying a location of the contact point within the user's environment and then determining a location within the virtual environment corresponding to the location of the contact point. For example, the location of the contact point in the user's environment can correspond to a point on a virtual wall in the virtual environment 715. The process 500 then overlays the hand passthrough video feed on the corresponding location of the contact point in the virtual environment 715, displaying the portion of the user's environment they are pointing to within the flashlight partial passthrough 705.

Reference in this specification to "implementations" (e.g., "some implementations," "various implementations," "one implementation," "an implementation," etc.) means that a particular feature, structure, or characteristic described in connection with the implementation is included in at least one implementation of the disclosure. The appearances of these phrases in various places in the specification are not necessarily all referring to the same implementation, nor are separate or alternative implementations mutually exclusive of other implementations. Moreover, various features are described which may be exhibited by some implementations and not by others. Similarly, various requirements are described which may be requirements for some implementations but not for other implementations.

As used herein, being above a threshold means that a value for an item under comparison is above a specified other value, that an item under comparison is among a certain specified number of items with the largest value, or that an item under comparison has a value within a specified top percentage value. As used herein, being below a threshold means that a value for an item under comparison is below a specified other value, that an item under comparison is among a certain specified number of items with the smallest value, or that an item under comparison has a value within a specified bottom percentage value. As used herein, being within a threshold means that a value for an item under comparison is between two specified other values, that an item under comparison is among a middle-specified number of items, or that an item under comparison has a value within a middle-specified percentage range. Relative terms, such as high or unimportant, when not otherwise defined, can be understood as assigning a value and determining how that value compares to an established threshold. For example, the phrase "selecting a fast connection" can be understood to mean selecting a connection that has a value assigned corresponding to its connection speed that is above a threshold.

As used herein, the word "or" refers to any possible permutation of a set of items. For example, the phrase "A, B, or C" refers to at least one of A, B, C, or any combination thereof, such as any of: A; B; C; A and B; A and C; B and C; A, B, and C; or multiple of any item such as A and A; B, B, and C; A, A, B, C, and C; etc.

Although the subject matter has been described in language specific to structural features and/or methodological acts, it is to be understood that the subject matter defined in the appended claims is not necessarily limited to the specific features or acts described above. Specific embodiments and implementations have been described herein for purposes of illustration, but various modifications can be made without deviating from the scope of the embodiments and implementations. The specific features and acts described above are disclosed as example forms of implementing the claims that follow. Accordingly, the embodiments and implementations are not limited except as by the appended claims.

Any patents, patent applications, and other references noted above are incorporated herein by reference. Aspects can be modified, if necessary, to employ the systems, functions, and concepts of the various references described above to provide yet further implementations. If statements or subject matter in a document incorporated by reference conflicts with statements or subject matter of this application, then this application shall control.

We claim:

1. A method for providing partial passthrough video to a user of a virtual reality device, the method comprising:
   displaying, to the user, a computer generated virtual environment;
   detecting a hand passthrough trigger event based on a user action and/or a condition that occurs in the user's real-world environment;
   in response to detecting the hand passthrough trigger event, identifying a hand passthrough video feed, from one or more cameras of the virtual reality device, that captures the user's real-world environment;
   aligning the hand passthrough video feed with a portion of the virtual environment by matching a location of a real-world object and/or a location of a real-world hand of the user to a corresponding location in the virtual environment; and
   dynamically overlaying the hand passthrough video feed, comprising the real world hand of the user and/or the real-world object, over the aligned portion of the virtual environment, wherein the dynamically overlaying provides, to the user via the hand passthrough video, a depth accurate view of a) the real-world hand of the user and/or b) the real-world object.

2. The method of claim 1, wherein the detecting the hand passthrough trigger event comprises identifying that the user made a particular gesture based on a monitored pose of the user's hand, wherein the pose of the user's hand is monitored A) using input from one or more sensors attached to the user's hand or wrist and/or B) by analyzing images captured by the virtual reality device.

3. The method of claim 1, wherein the detecting the hand passthrough trigger event comprises: a) identifying that a hand of the user exited a designated area; or b) determining that a hand of the user is within a threshold distance of a real-world surface or object.

4. The method of claim 1, wherein the detecting the hand passthrough trigger event comprises identifying a predicted collision between a part of the user and the real-world object by analyzing, with a determined current hand velocity and trajectory, a kinematic model of the user.

5. The method of claim 1, wherein the detecting the hand passthrough trigger event comprises determining that the user spoke a particular voice command or pressed a particular button associated with the virtual reality device.

6. The method of claim 1,
   wherein the detecting the hand passthrough trigger event is based on an action of a hand of the user; and
   wherein the identifying the hand passthrough video feed comprises:
      identifying, in one or more images from the one or more cameras of the virtual reality device, the hand of the user that performed the action; and
      identifying an area, in the one or more images from the one or more cameras of the virtual reality device, around the identified hand.

7. The method of claim 1, wherein the identifying the hand passthrough video feed comprises:
   determining a point where a particular straight or curved line, extending from a hand of the user, intersects with the real-world object or real-world surface; and
   identifying an area, in one or more images from the one or more cameras of the virtual reality device, around the determined point.

8. The method of claim 1,
   wherein the detecting the hand passthrough trigger event is based on an identification of the real-world object in one or more images from the one or more cameras of the virtual reality device; and
   wherein the identifying the hand passthrough video feed comprises identifying an area, in the one or more images from the one or more cameras of the virtual reality device, around the identified real-world object.

9. The method of claim 1,
   wherein the detecting the hand passthrough trigger event is based on an identification of the real-world object or a surface in one or more images from the one or more cameras of the virtual reality device; and
   wherein a size of the hand passthrough video feed is set based on a determined distance between a hand of the user and the identified real-world object or surface.

10. The method of claim 1, wherein the identifying the hand passthrough video feed comprises:
    identifying, in one or more images from the one or more cameras of the virtual reality device, a first hand of the user and a second hand of the user; and
    identifying an area, in the one or more images from the one or more cameras of the virtual reality device, around the identified first hand, wherein the size of the area is based on a determined distance between the first hand and the second hand.

11. The method of claim 1, wherein,
    the dynamically overlaying the hand passthrough video feed comprises replacing the aligned portion of the virtual environment with the hand passthrough video feed, and
    the dynamically overlaying the hand passthrough video feed simultaneously displays, to the user: a) a remaining portion of the virtual environment that is not covered by the overlaid passthrough video feed, and b) the user's real-world environment captured by the one or more cameras.

12. The method of claim 1, wherein the dynamically overlaying is performed by:
    tracking the user's hand in the user's real-world environment, wherein the alignment of the hand passthrough video feed with respect to the virtual environment is updated based on the tracking; and
    moving the dynamically overlaid hand passthrough video feed based on the updated alignment to achieve the depth-accurate view.

13. The method of claim 1, wherein the matching the location of the real-world object and/or the user's hand in the user's real-world environment to the corresponding location in the virtual environment includes matching coordinates associated with the handpassthrough video feed to coordinates in the virtual environment.

14. A computing system for providing partial passthrough video to a user of a virtual reality device, the computing system comprising: one or more processors; and one or more memories storing instructions that, when executed by the one or more processors, cause the computing system to perform a process comprising:
    displaying, to the user, a computer generated virtual environment;
    detecting a hand passthrough trigger event based on a user action and/or a condition that occurs in the user's real-world environment;
    in response to detecting the hand passthrough trigger event, identifying a hand passthrough video feed, from one or more cameras of the virtual reality device, that captures the user's real-world environment;
    aligning the hand passthrough video feed with a portion of the virtual environment by matching a location of a real-world object and/or a location of a real-world hand of the user to a corresponding location in the virtual environment; and dynamically overlaying the hand passthrough video feed, comprising the real world hand of the user and/or the real-world object, over the aligned portion of the virtual environment, wherein the dynamically overlaying provides, to the user via the hand passthrough video, a depth accurate view of a) the real-world hand of the user and/or b) the real-world object.

15. The computing system of claim 14, wherein the detecting the hand passthrough trigger event comprises determining that a hand of the user is within a threshold distance of the real-world object or a real-world surface.

16. The computing system of claim 14, wherein the detecting the hand passthrough trigger event comprises identifying that the user made a particular gesture based on a monitored pose of the user's hand, wherein the pose of the user's hand is monitored A) using input from one or more sensors attached to the user's hand, wrist, or forearm and/or B) by analyzing images captured by the virtual reality device.

17. The computing system of claim 14,
wherein the detecting the hand passthrough trigger event is based on an action of a hand of the user; and
wherein the identifying the hand passthrough video feed comprises:
identifying, in one or more images from the one or more cameras of the virtual reality device, the hand of the user that performed the action; and
identifying an area, in the one or more images from the one or more cameras of the virtual reality device, around the identified hand.

18. The computing system of claim 14, wherein the detecting the hand passthrough trigger event comprises identifying that a hand of the user exited a designated area.

19. A computer-readable storage medium storing instructions that, when executed by a computing system, cause the computing system to perform a process comprising:
displaying, to the user, a computer generated virtual environment;
detecting a hand passthrough trigger event based on a user action and/or a condition that occurs in the user's real-world environment;
in response to detecting the hand passthrough trigger event, identifying a hand passthrough video feed, from one or more cameras of the virtual reality device, that captures the user's real-world environment;
aligning the hand passthrough video feed with a portion of the virtual environment presented to the user by the virtual reality device by matching a location of a real-world object and/or a location of a real-world hand of the user to a corresponding location in the virtual environment; and
dynamically overlaying the hand passthrough video feed, comprising the real world hand of the user and/or the real-world object, over the aligned portion of the virtual environment, wherein the dynamically overlaying provides, to the user via the hand passthrough video, a depth accurate view of a) the real-world hand of the user and/or b) the real-world object.

20. The computer-readable storage medium of claim 19, wherein the identifying the hand passthrough video feed comprises:
determining a point where a particular straight or curved line, extending from a hand of the user, intersects with the real-world object or a real-world surface; and
identifying an area, in one or more images from the one or more cameras of the virtual reality device, around the determined point.

* * * * *